No. 800,053. PATENTED SEPT. 19, 1905.
H. C. AYRES.
ANGULAR CONDUIT FOR ELECTRICAL WIRING.
APPLICATION FILED MAR. 13, 1905.

Witnesses
R. H. Boswell
Clara S. Davenport

Inventor
Henry C. Ayres.
By Franklin H. Hough
Attorney

UNITED STATES PATENT OFFICE.

HENRY C. AYRES, OF GREENVILLE, OHIO, ASSIGNOR TO THE ADJUSTABLE FIXTURE AND MANUFACTURING COMPANY, OF GREENVILLE, OHIO.

ANGULAR CONDUIT FOR ELECTRICAL WIRING.

No. 800,053.      Specification of Letters Patent.      Patented Sept. 19, 1905.

Application filed March 13, 1905. Serial No. 249,906.

*To all whom it may concern:*

Be it known that I, HENRY C. AYRES, a citizen of the United States, residing at Greenville, in the county of Darke and State of Ohio, have invented certain new and useful Improvements in Angular Conduits for Electrical Wiring; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in angular conduits for electric wiring; and the object of the invention is to produce a simple, efficient, and ornamental device of this nature which may be applied to a wainscoting, footboard, or other ledge and so arranged as to contain electrical conductors and provided with a removable cover which with the conduit forms an ornamental surface.

The invention consists, further, in various details of construction and arrangements of parts, which will be hereinafter fully described and then specifically defined in the appended claim.

My invention is illustrated in the accompanying drawings, which, with the letters of reference marked thereon, form a part of this application, and in which—

Figure 1:
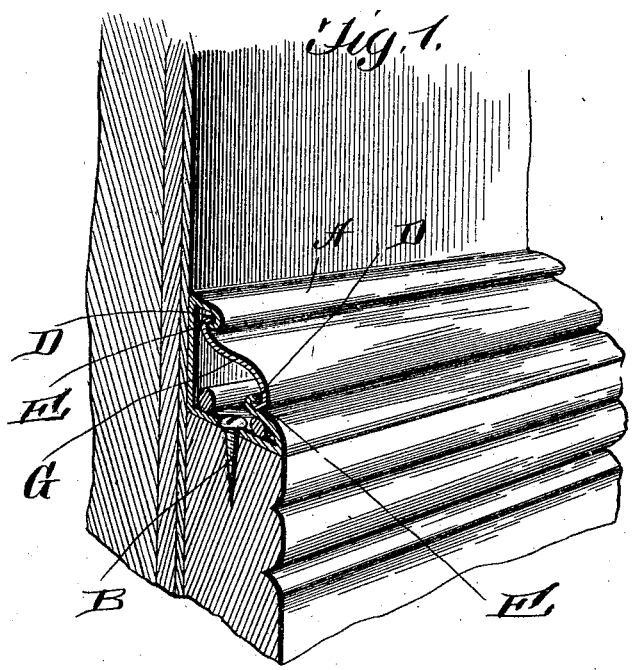
Figure 2:
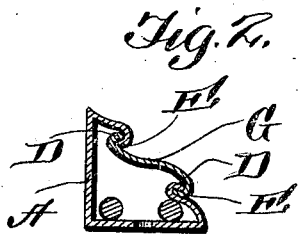

Figure 1 is a perspective view showing my improved conduit as applied to the wall of a room. Fig. 2 is a sectional view through the device, and Fig. 3 is a view of a modified form of conduit.

Reference now being had to the details of the drawings by letter, A designates a metallic conduit which is of general triangular shape in cross-section and adapted to be held by means of a screw B to a wainscoting, footboard, or other ledge and is provided with an opening in which conductor-wires may be inserted. The marginal edges of the opening into the conduit are turned to form hook-shaped flanges D, which are adapted to be engaged by the hooked portions E of the opposite longitudinal edges of the cover G. Said cover is made substantially S-shaped in cross-section and being of a resilient material will allow the opposite edges thereof to be sprung over the hook-shaped edges along the marginal portions of the opening into the conduit.

Figure 3:

In Fig. 3 of the drawings I have shown a slight change in the shape of the conduit, showing a slightly-modified form of cover K, which is adapted to yieldingly engage the edges of the opening into the conduit A'.

By the provision of the form of conduit as shown and described it will be observed that a simple and efficient means is afforded to hold electric conductor-wires upon wainscoting, footboards, or other ledges and presenting an inclined ornamental surface in which is positioned the removable cover, whereby access may be readily had to the conduit.

While I have shown a particular form of conduit embodying the features of this invention, it will be understood that I may vary the same, if desired, in different ways without in any way departing from the spirit of the invention.

Having thus fully described my invention, what I claim as new, and desire to secure by Letters Patent, is—

An angular conduit for electric wiring having an opening in the inclined face thereof, the marginal edges of the opening into said conduit being bent in opposite directions forming hook-shaped portions, a cover of resilient material substantially S-shaped in cross-section and adapted to engage said hook-shaped portions, and form a symmetrical closure for the conduit, as set forth.

In testimony whereof I hereunto affix my signature in presence of two witnesses.

HENRY C. AYRES.

Witnesses:
    A. L. HOUGH,
    FRANKLIN H. HOUGH.